United States Patent [19]

Nash et al.

[11] Patent Number: 5,010,565
[45] Date of Patent: Apr. 23, 1991

[54] APPARATUS AND METHOD FOR ADDING CORDLESS HANDSET CAPABILITY TO AN EXISTING CORDED TELEPHONE

[76] Inventors: Bryan Nash, 2561 E. 3370 South, Salt Lake City, Utah 84109; Trenton D. Stoddard, 5872 Fontaine Bleu Dr., Salt Lake City, Utah 84121

[21] Appl. No.: 546,567

[22] Filed: Jun. 29, 1990

[51] Int. Cl.⁵ ............................................. H04M 11/00
[52] U.S. Cl. ......................................... 379/61; 379/58
[58] Field of Search .................... 320/20; 379/58, 59, 379/61, 66, 422, 428, 447; D14/53

[56] References Cited

U.S. PATENT DOCUMENTS

| | | | |
|---|---|---|---|
| D. 283,420 | 4/1986 | Reichenstein | D14/53 |
| 3,476,882 | 11/1969 | Vogelman et al. | 379/61 |
| 4,005,269 | 1/1977 | Willis | 379/61 |
| 4,119,800 | 10/1978 | Girardi | 179/2 |
| 4,593,409 | 6/1986 | Miller | 455/73 |
| 4,634,810 | 1/1987 | Grassl et al. | 379/61 |
| 4,691,338 | 9/1987 | Makino | 379/61 |
| 4,700,375 | 10/1987 | Reed | 379/61 |
| 4,752,949 | 6/1988 | Steinbeck et al. | 379/61 |
| 4,754,473 | 6/1988 | Edwards | 379/58 |
| 4,775,996 | 10/1988 | Emerson et al. | 379/56 |
| 4,775,997 | 10/1988 | West, Jr. et al. | 379/58 |
| 4,794,636 | 12/1988 | Sanglier et al. | 379/62 |
| 4,839,918 | 6/1989 | Hata | 379/61 |
| 4,882,745 | 11/1989 | Silver | 379/61 |
| 4,908,847 | 3/1990 | Hannan et al. | 379/61 |
| 4,937,852 | 6/1990 | Manzarek | 379/61 |
| 4,939,770 | 7/1990 | Makino | 379/61 |

FOREIGN PATENT DOCUMENTS 3434686 9/1984 Fed. Rep. of Germany ........ 379/61
1137856 5/1989 Japan ..................................... 379/61

OTHER PUBLICATIONS

Telephony 3/30/87, p. 64, "Cellular Adapter", Cellular System.
Telephony 12/15/86, p. 62, #185.
Hattori, Sasaki, Momma, "Emerging Technology and Service Enhancement for Cordless Telephone System", IEEE Communications, vol. 26, #1, Jan. 1988.

Primary Examiner—Jin F. Ng
Assistant Examiner—William Cumming
Attorney, Agent, or Firm—Workman, Nydegger & Jensen

[57] ABSTRACT

An apparatus for adding cordless handset capability to an existing corded telephone is disclosed. A cordless handset replaces the corded handset of the existing corded telephone. The cordless handset includes a wireless transmitter, a wireless receiver, a battery to provide power to the cordless handset, and a battery charging connector. A cradle insert forms a substitute handset cradle over the original handset cradle of the corded telephone. The substitute handset cradle receives the cordless handset when it is not in use. Charging contacts are provided on the substitute handset cradle to charge the batteries of the cordless handset. The substitute cradle allows operation of the hook switch of the corded telephone when the cordless handset is placed into the substitute cradle.

48 Claims, 9 Drawing Sheets

APPARATUS AND METHOD FOR ADDING CORDLESS HANDSET CAPABILITY TO AN EXISTING CORDED TELEPHONE

BACKGROUND

1. The Field of the Invention

This invention relates to cordless telephone devices. More particularly, the present invention relates to apparatus and methods for adding cordless handset capability to an existing corded telephone.

2. The Prior Art

The telephone has become an indispensable part of a modern society. Voice communications between people separated by thousands of miles has become commonplace. Telephone service has become so pervasive that mobile telephone service is available in automobiles and commercial aircraft and portable telephones may be carried and used by a person nearly any place a person might want to venture.

The availability of mobile (installed in a vehicle or craft of some type) and portable (battery operated and self contained) telephones has caused consumers to expect instant telephone communications service wherever they roam. In many areas, large numbers of residences now have one or more cordless telephones. Consumers have now come to expect that the freedom which a mobile, portable, or cordless telephone provides will be available everywhere.

When a mobile, portable, or cordless telephone is not available, corded telephones still continue to be widely used. A corded telephone includes a base housing the necessary electrical circuitry and providing a keypad or rotary dial set. The corded base unit has a line jack which is interconnected by wires or cable to a telephone network. The corded base unit also provides a handset jack which is connected by wires or a cable to a handset having a handset receiver and a handset transmitter.

In contrast to a corded telephone, a cordless telephone is one which comprises a handset which includes a wireless transmitter and a wireless receiver which communicate with a cordless base which includes a corresponding wireless transmitter and receiver. The base unit has a line jack which is connected by wires or cables to a telephone network as in the case of a corded telephone.

With a cordless telephone, a user can roam distances from the base unit without the restrictions imposed by the handset cord. In comparison, the user of a corded telephone is limited in the distance from the base unit that can be traveled by the length of the cord between the handset and the base unit. Moreover, the handset cord often becomes inconveniently tangled.

While cordless telephones have become commonplace in residential use, cordless telephones are not widely used in business applications. This is so even though users of business telephone systems have long desired cordless telephones in their business settings.

One reason for the lack of cordless telephone capability in business settings is that the capital investment in existing corded business telephone equipment is very substantial. Due to the large capital investment in corded telephone equipment, prudent business people are hesitant to discard existing corded telephone equipment merely to add cordless handset capability to an existing business telephone system. Moreover, in most business settings, a business telephone must interconnect with a business' telephone system rather than with the local telephone network. Thus, a business user must find a cordless business telephone which is compatible with the existing business telephone system or face the choice of replacing or modifying the business telephone system to add cordless handset capability.

In view of the above described problems in the prior art, it would be an advance in the art to provide a system and method for economically adding cordless handset capability to an existing corded telephone without making any permanent modifications to the existing corded telephone. It would also be an advance in the art to provide a system and method for adding cordless handset capability to an existing corded telephone which takes a minimum of time to install on the existing corded telephone and does not require any internal modification to the telephone or to the telephone system to which it is connected.

OBJECTS AND BRIEF SUMMARY OF THE INVENTION

In view of the above described state of the art, the present invention seeks to realize the following objects and advantages.

It is a primary object of the present invention to add cordless handset capability to an existing corded telephone.

It is also an object of the present invention to add cordless handset capability to an existing corded telephone in an economical manner.

It is another object of the present invention to add cordless handset capability to an existing corded telephone without requiring any permanent modifications to the existing corded telephone.

It is still another object of the present invention to add cordless handset capability to an existing corded telephone such that the corded telephone may be readily restored to its original configuration.

It is yet another object of the present invention to provide a structure and method of adding cordless handset capability to an existing corded telephone which requires a minimum amount of time to add the cordless handset capability to each corded telephone.

It is still another object of the present invention to add cordless handset capability to an existing corded telephone while still retaining the use of the corded handset and automatically selecting between the corded handset and the cordless handset depending upon the desires of the user.

It is another object of the present invention to add cordless handset capability to an existing corded telephone without requiring any modifications internally to the corded telephone or to the telephone system to which the telephone is connected.

It is a still further object of the present invention to add cordless handset capability to an existing corded telephone when the existing corded telephone is a multi-line telephone connected to a business telephone network.

These and other objects and advantages of the invention will become more fully apparent from the description and claims which follow, or may be learned by the practice of the invention.

The present invention provides an apparatus and method for adding cordless handset capability to an existing corded telephone. The existing corded telephone base includes an original handset cradle which is part of the corded telephone base and which receives a corded handset.

The apparatus of the present invention can include a cordless handset which replaces the corded handset. The cordless handset includes a wireless transmitter, a wireless receiver, a battery to provide power to the cordless handset, and a battery charging connector. The cordless handset also can desirably include a switch which functions to activate the cordless handset, or take it on or off hook, as desired by the user.

Importantly, the present invention includes a cradle insert means for forming a substitute handset cradle over the original handset cradle. The substitute handset cradle is adapted to receive a cordless handset configured according to the present invention.

The embodiments of the present invention may also include hook switch control means. The hook switch control means functions to take the telephone off and on hook as the handset is raised and lowered into the cradle or as the user operates a switch on the handset.

The substitute handset cradle of the present invention may take many different configurations. A number of substitute handset cradles may be provided, each configured to be secured over or into the original handset cradle and also to receive one or more cordless handsets.

The present invention also includes charging contact means on the cradle insert means or substitute handset cradle. The charging contact means functions to provide a charging current to the battery charging connector on the cordless handset when the cordless handset is resting in the substitute cradle. A separate charging cradle may also be provided to facilitate charging of the batteries in the cordless handset.

A cordless base, comprising a wireless transmitter, a wireless receiver, and a charging circuit means for providing a charging current to the charging contact means, is also provided. An interconnection means may also be included in the embodiments of the present invention. The interconnection means functions to electrically connect the cordless base to the substitute handset cradle so as to convey the charging current to the substitute cradle so that the batteries provided in the cordless handset are charged when the cordless handset is resting in the substitute cradle. The interconnection means may also function to convey audio information between the cordless base and the corded telephone and to facilitate the carrying out of hook switch functions.

BRIEF DESCRIPTION OF THE DRAWINGS

FIGS. 7-1 and 7-2 are a detailed schematic diagram of the interface circuits represented in FIG. 6.

DETAILED DESCRIPTION OF THE PREFERRED EMBODIMENTS

Reference will now be made to the drawings wherein like structures will be provided with like reference designations.

Figure 1:
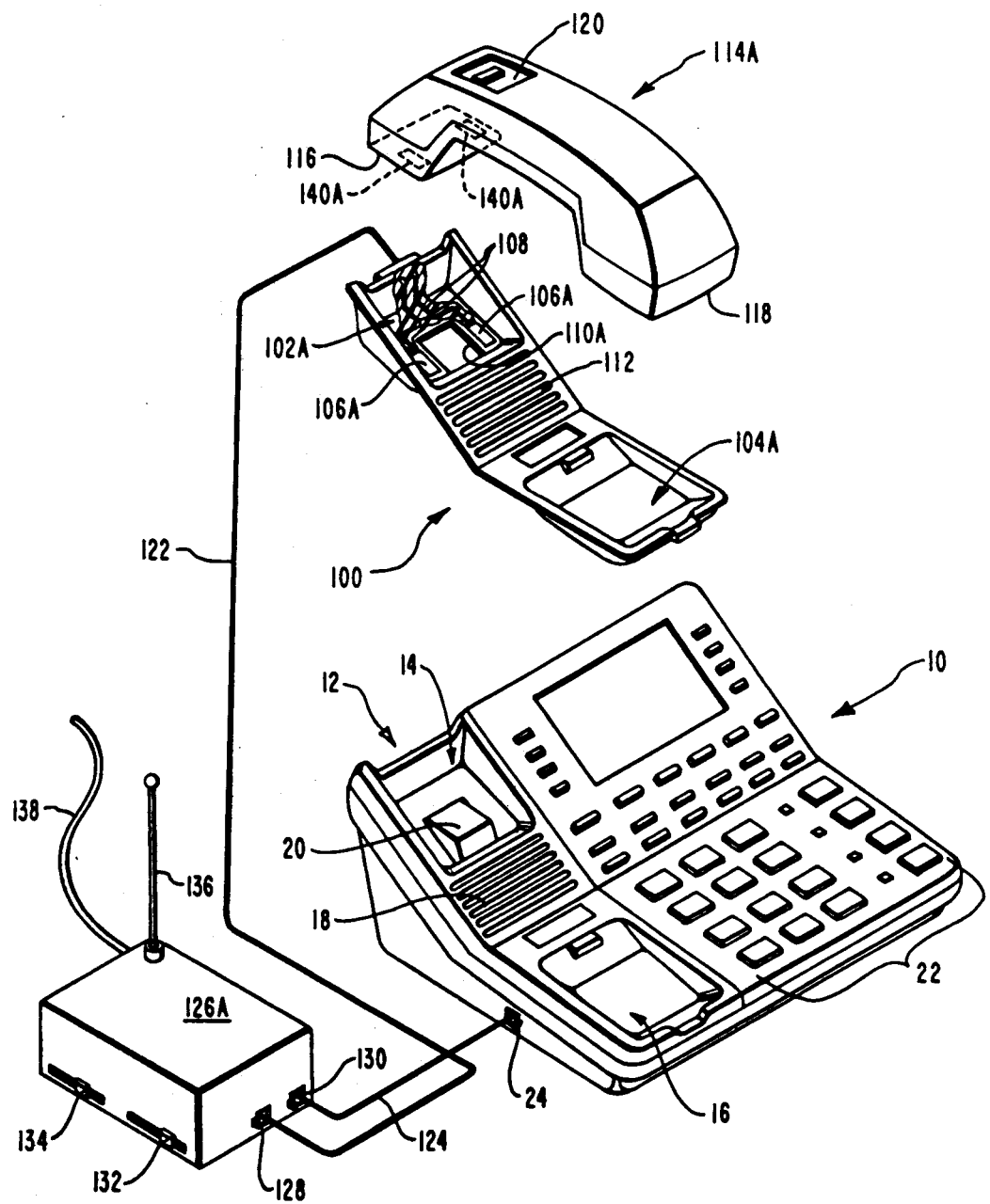
FIG. 1 is an exploded perspective view of a first presently preferred embodiment of the present invention installed on an existing corded telephone.

Represented in FIG. 1 is a corded telephone to which has been added the structures of the present invention so as to add cordless handset capability to the existing telephone. The corded handset and handset cord (not shown) have been removed from the corded telephone represented in FIG. 1 leaving a corded telephone base 10 and the structures of the first presently preferred embodiment which will all be described shortly.

The corded telephone base comprises an original telephone cradle, generally designated at 12, which includes a handset receiver receptacle and a handset transmitter receptacle, generally designated at 14 and 16, respectively. The original cradle 12 may be configured differently than that represented in the figures but the different configurations all serve to receive some type of handset. The corded telephone base also includes a plurality of buttons and other controls designated at bracket 22.

Located within the handset receiver receptacle 14 is a hook switch 20. The hook switch 20 functions to sense when a handset has been lowered into the receptacle 12. The hook switch 20 indicates to the telephone and the telephone system when a person "hangs up" or "answers" a call. Also represented is a speaker grill 18 under which is positioned a speaker which can be used for providing an audible ring and/or speaker phone operation.

Also represented in FIG. 1 is a handset jack 24. Prior to the installation of the present invention, the handset jack 24 was connected to the handset cord (not shown in FIG. 1) of the original handset and provided communication between the corded handset (not shown in FIG. 1) and the corded telephone base 10. The corded telephone base 10 is connected to the telephone network or business telephone system by a line jack (not shown) provided on the corded telephone base 10 and a wire or cable (not shown). Presently, the most common style of connector for the handset jack and the line jack are various "sizes" of the RJ series of jacks along with the corresponding plugs.

Represented in FIG. 1 is a substitute cradle generally designated at 100 shown positioned above the original cradle 12 and on which the substitute cradle 100 will be secured. The substitute cradle of the present invention may, according to the particular application, be secured on, over, or into the original cradle of the existing corded telephone. The substitute cradle 100 is just one example of a cradle insert means for forming a substitute handset cradle in the place of the original handset cradle. Other structures performing similar functions, including those different structures which can be devised by one having skill in the art using the teachings contained herein, are intended to be considered equivalent to the illustrated and described structures.

The substitute cradle includes a handset receiver receptacle 102A and a handset transmitter receptacle 104A which receive the handset receiver 116 and the handset transmitter 118, respectively, of a cordless handset generally designated at 114A in FIG. 1. A speaker grill 112 is provided on the substitute cradle so as to be positioned over speaker grill 18 provided on the corded telephone base.

An aperture 110A is positioned in the handset receiver receptacle 102A through which the hook switch 20 can protrude and continue to operate. A switch 120 is provided on the cordless handset 114A which in combination with aperture 110A and hook switch 20 may perform hook switch or flash functions in accordance with the teachings of the present invention. The combination of hook switch 20, aperture 110A and switch 120 are one presently preferred example of a hook switch means for actuating the hook switch on the existing telephone.

The cordless handset may be one which utilizes radio frequency, optical, or a combination of both, or other types of, communication links with which wireless communication may occur.

The cordless handsets described herein incorporate one or more rechargeable cells, or some other electrical storage devices, which are used to power the functions of the cordless handset. It is preferred that rechargeable nickel cadmium cells be incorporated into the cordless handset, however, other electrical storage devices might also be used. Those skilled in the art will appreciate that different types of electrical storage devices each provide different advantages and disadvantages and may be selected depending upon the particular application of the system.

As shown in the cut away portion of the cordless handset 114A, the handsets which are suitable for use with the present invention are provided with a charging connector. The two conductive pads 140A positioned on the handset receiver of the cordless handset 114A function as the charging connector in the cordless handset represented in FIG. 1. In its herein described preferred form, the charging connector is adapted to receive a direct current flow which, when applied to the internal rechargeable battery, will charge the battery from a discharged condition to a charged condition in an appropriate length of time.

Still referring to FIG. 1, the substitute cradle 100, or other cradle insert means, is provided with one example of a charging contact means for providing a charging current to the battery charging connection on the cordless handset when the cordless handset is resting in the substitute cradle. The illustrated preferred examples of a charging contact means are not intended to be limiting and structures performing similar functions are to be considered equivalent thereto. A pair of charging contacts 106A illustrated in FIG. 1 are exemplary of a charging contact means.

The charging contacts 106A are connected to a charge interconnect cable 122 by wires 108 which may be embedded in the substitute cradle or affixed to its surface. Charge interconnect cable 122 is connected to a cordless base 126A which contains a charging circuit as well as other circuitry as will be explained later in this disclosure. The cordless base 126A may also include a battery charging pocket (not illustrated) to receive and charge a spare battery for use in the cordless handset 114A.

The charge interconnect cable 122 is an example of the interconnection means of the present invention. In the embodiment illustrated in FIG. 1, the charge interconnect cable 122 and an audio interconnect cable 124 function as an interconnection means. In other embodiments of the invention, the number, form, and/or arrangement of the cables functioning as the interconnection means may be different.

In the embodiment represented in FIG. 1, the charge interconnect cable 122 is routed from the cordless base 126A to the substitute cradle 100 exteriorly to the corded telephone base. Significantly, since the charge interconnect cable 122 does not enter the corded telephone base 10, installation of the embodiment of the present invention is simple and quick. The charge interconnect cable 122 is desirably routed in an inconspicuous path on the exterior of the corded telephone base 100 and secured thereto so that the charge interconnect cable 122 remains out of the way.

Routing the charge interconnect cable on the exterior of the corded telephone base 100 provides several advantages. An exterior routing provides easy and quick installation. Also, no permanent modifications to the existing corded telephone base is necessary to install the embodiments of the present invention. Moreover, if it is ever necessary to restore the corded telephone to its original state, such a restoration may be quickly accomplished.

The substitute cradle 100 represented in FIG. 1 is constructed so as to reflect the shape of the original cradle 12. Thus, when the substitute cradle 100 is secured over the original cradle 12 the appearance of the corded telephone base 10 changes very little. In most cases it is advantageous to configure the lower side of the substitute cradle to mate with the original cradle on the corded telephone base. The upper side of the substitute cradle, including the handset receiver and the handset transmitter receptacles, may be fabricated to fit a standard configuration of cordless handset. In this way, a single configuration of cordless handset may be used to add cordless handset capability to a large number of existing corded telephones by merely supplying a number of readily manufactured substitute cradles. The provision of a number of substitute cradles, each fabricated to fit on one or more corded telephone bases, greatly simplifies and economizes on equipment cost and installer time when adding cordless handset capability to different existing corded telephones.

As in the case of the charging cable connection, there is no need to modify the operation or circuits of the existing corded telephone, or to invade the housing of the corded telephone base 100, to make the necessary communications connections between the handset jack 24 on the corded base 10 and an audio jack 130 on the cordless base 126 by the audio interconnect cable 124. The routing of the audio interconnect cable 124 should be out of the way and secured in place. As can be observed in FIG. 1, the customary modular RJ series of jacks and plugs can be used with the charge interconnect and audio interconnect cables, 122 and 124, respectively.

Still referring to FIG. 1, the cordless base 126 includes a charging jack 128, the audio jack 130, two volume controls 132 and 134, an antenna 136, and a power cord 138 which is to be connected to a source of AC power such as commonly available power distribution wiring. The cordless base includes circuits such as wireless transmitters and receivers and a charging circuit. The circuitry which is included within the cordless base 126 will be described in greater detail later in this disclosure.

Figure 2:
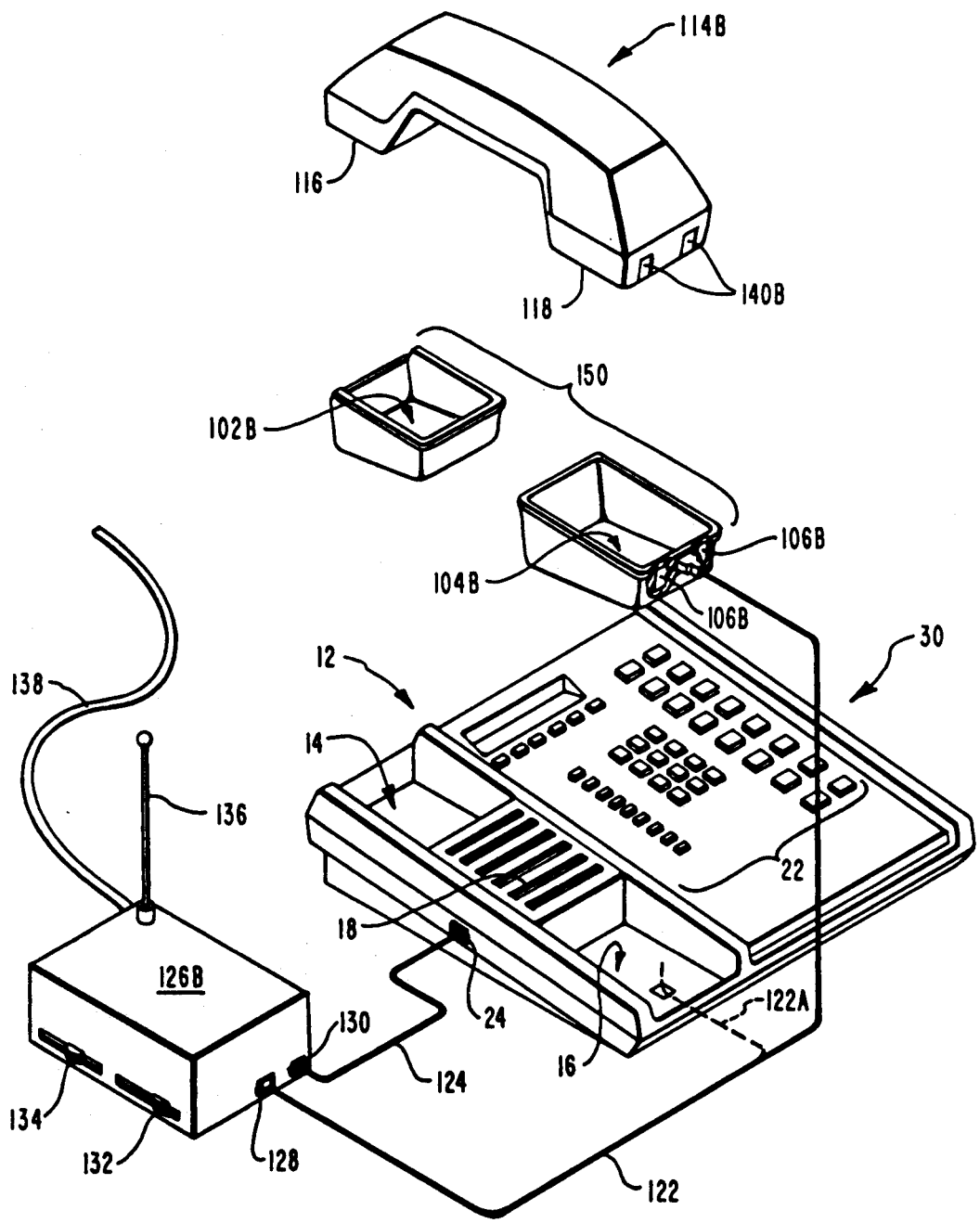
FIG. 2 is an exploded perspective view of a second presently preferred embodiment of the present invention installed on another existing corded telephone.

Referring next to FIG. 2, a second presently preferred embodiment of the present invention is represented. Represented in FIG. 2 is another corded telephone to which is being added the structures of the present invention so as to add cordless handset capability to the existing corded telephone. The corded handset and handset cord (not shown) have been removed from the corded telephone represented in FIG. 2 leaving a corded telephone base 30 and the structures of the second presently preferred embodiment which will be described shortly.

The corded telephone base 30 comprises an original telephone cradle, generally designated at 12, which includes a handset receiver receptacle and a handset transmitter receptacle, generally designated at 14 and 16, respectively. The original cradle 12 represented in FIG. 2 is configured differently than the original cradle represented in FIG. 1. Nevertheless, the structures of the present invention may be adapted to fit into any number of original cradles while still receiving the same general configuration of cordless handset 114B. The corded telephone base 30 illustrated in FIG. 2 also includes a plurality of buttons and other controls designated by bracket 22.

The cordless handset 114B includes a handset receiver 116, a handset transmitter 118, and conductive charging pads 140A. The cordless handsets used with the present invention are preferably all the same dimensions but may be provided with different features.

Represented in FIG. 2 is another substitute cradle of the present invention generally designated by bracket 150 shown positioned above the original cradle 12 and into which the substitute cradle 150 will be secured. The substitute cradle 150 is another example of a cradle insert means for forming a substitute handset cradle in the place of the original handset cradle.

The substitute cradle 150 shown in FIG. 2 includes a handset receiver receptacle 102B and a handset transmitter receptacle 104B which receive the handset receiver 116 and the handset transmitter 118 of a cordless handset 114B in FIG. 2. In the second presently preferred embodiment of the present invention represented in FIG. 2, the handset receiver receptacle 102B and the handset transmitter receptacle 104B are separate from one another. In contrast, the handset receiver receptacle 102A and handset transmitter receptacle 104A included in the first embodiment represented in FIG. 1 are connected together. Either illustrated configuration for a substitute cradle may be used in accordance with the present invention.

The charging contacts 106B included in handset transmitter receptacle 104B make contact with conductive charging pads 140B provided on cordless handset 114B when the handset is placed into the substitute receptacle 150. The conductive charging pads 140B are another example of a charging connector provided on a cordless handset.

As with the embodiment represented in FIG. 1, an interconnection between the charging contacts 106B and the charging circuit (not illustrated in FIG. 2) included in the cordless base 126B is provided by the charge interconnect cable 122. As described earlier, the charge interconnect cable 122 can be routed externally to the corded telephone. Alternatively, the charge interconnect cable 122 can be routed through the housing of the corded telephone base 30 as shown by the dashed line 122A. While routing the charge interconnect cable 122 through the corded telephone base 30 requires additional steps and time at the present invention is installed, it may desirable in some applications.

When the charge interconnect cable 122 is routed through the corded telephone base 30 housing, appropriate connectors may be included on the base and on the cable. Also, the corded telephone base 30 includes structures to noncontactively sense when a handset has been placed therein. Thus, there is no accommodation for a hook switch in the embodiment illustrated in FIG. 2. Still, the cordless handset can be readily adapted to include any sensing trigger structure (e.g., a magnet) which might be required to operate the hook switch or hook switch flash function of a corded telephone.

Advantageously, the configuration of substitute cradle 150 represented in FIG. 2 can be adapted so that a single configuration of cordless handset can be used with a wide variety of corded telephone bases. This feature of the present invention allows many different corded telephones to readily benefit from the present invention. In accordance with the present invention, only a single configuration of handset needs to be manufactured with a different configuration of substitute cradle, each capable of receiving the same configuration of cordless handset, being manufactured for each different configuration of corded telephone.

Figure 3:
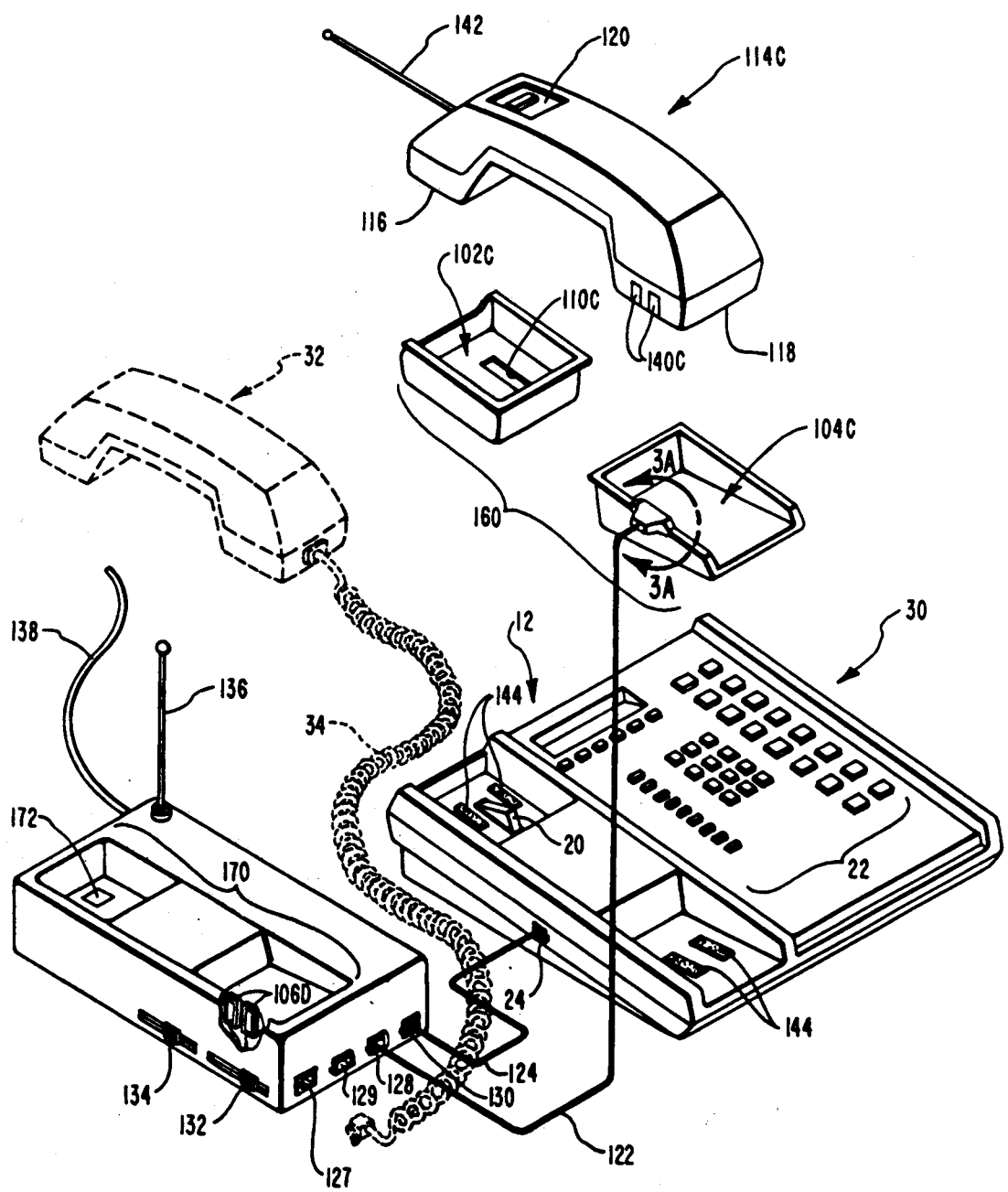
FIG. 3 is an exploded perspective view of a third presently preferred embodiment of the present invention installed on an existing corded telephone.

Referring next to FIG. 3, a third presently preferred embodiment of the present invention is represented. Represented in FIG. 3 is the corded telephone base 30 to which is being added the structures of the present invention.

In addition to the previously described structures, the third presently preferred embodiment includes a charging cradle, indicated at bracket 170, formed on the cordless base 126C. The charging cradle 170 may also be fabricated as a separate structure. The charging cradle includes the charging contacts 106D and a sensing device 172 which functions as a means for detecting the presence of a handset in the charging cradle.

The original corded handset 32 of the corded telephone and handset cord 34 are shown in phantom image. The corded handset 32 and handset cord 34 may be removed as part of the method of the present invention. These parts can be stored and the telephone can be readily restored to its original corded condition at a later date if desired.

Alternatively, as suggested in FIG. 3, a handset jack 127 is provided and the handset cord 34 can be inserted therein making appropriate electrical contact. Thus, with the embodiment illustrated in FIG. 3, a user may choose to use either the corded handset 32 or the cordless handset 114C. Appropriate electrical circuits, which can be devised by one having skill in the art, can be incorporated into cordless base (or other structure) and function as a selection means for automatically selecting a communication path between the corded handset or the cordless handset. It will be appreciated that in order to include an automatic selection function, it will be necessary to link the hook switch control jack 129 to the corded telephone base 30 as will be explained shortly.

The inclusion of a charging cradle 170 allows a user to choose whether to use the corded or cordless handset and allows either handset to be placed in either cradle if desired. Significantly, if the corded handset is not a "K" style handset, or is a very unusual handset structure, the cordless handset can be kept in the charging cradle while the corded handset can be kept in the original cradle 12.

Additionally represented in FIG. 3 is another substitute cradle designated by bracket 160 which includes an handset receiver receptacle 102C and a handset transmitter receptacle 104C. The substitute cradle 160 is another example of a cradle insert means.

Also shown in FIG. 3 are mounds of an adhesive 144, for example a silicone rubber adhesive, which are placed in the original cradle 12 and function as a means for securing the handset receiver receptacle 102C and the handset transmitter receptacle 104C of the substitute cradle 160. Other structures, such as resilient clips or removable fasteners, can also be used to secure the components of the substitute cradle in, to, or over, the original cradle.

The handset receiver receptacle 102C is provided with an aperture 110C through which the hook switch 20 can protrude and continue to operate. The aperture 110C is another presently preferred example of a hook switch means for actuating the hook switch on the existing corded telephone as the cordless handset is raised and lowered.

The two conductive pads 140C positioned on the cordless handset 114C function as a charging connector. The charging contacts 106C (FIG. 3A) included in the handset transmitter receptacle 104C make contact with the charging pads 140C provided on the cordless handset 114C when the cordless handset is placed into the substitute receptacle. The charging pads 140C are another example of a charging connector provided on a cordless handset.

Figure 3A:
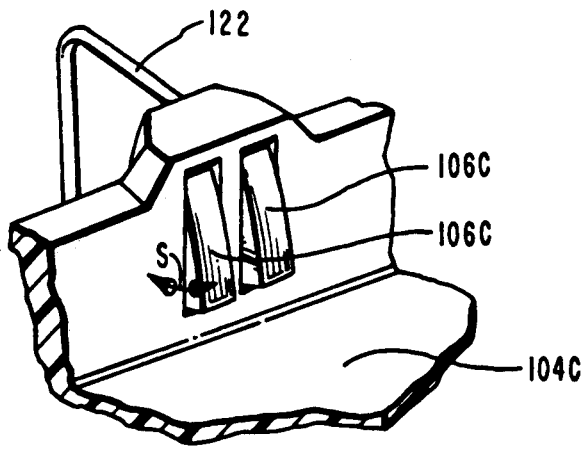
FIG. 3A is a perspective view of a portion of the third embodiment taken along line 3A—3A of FIG. 3.

FIG. 3A provides a detailed illustration of the charging contacts 106C. It will be noted from the perspective view provided in FIG. 3A that the charging contacts are configured as springs which flex in the direction of arrow S to ensure that a good electrical contact is created between the charging pads 140C and the charging contacts 106C when the cordless handset is placed in the substitute receptacle 160.

As with the other embodiments represented herein, an interconnection between the charging contacts 106C and the charging circuit (not illustrated in FIG. 3) included in the cordless base 126C is provided by the charge interconnect cable 122. The cordless base 126C is provided with a hook switch control jack 129 which is wired into the corded telephone base 30 as an alternative structure for providing hook switch control.

Those skilled in the pertinent arts will understand, using the teachings contained herein, the construction of the circuits necessary (and their interconnection) to obtain hook switch control, whether such control is desired by way of the switch 120 provided on the cordless handset 114C or a handset sensing device 172.

As described earlier, the charge interconnect cable 122 can be routed externally to the corded telephone. Alternatively, the charge interconnect cable 122 can be routed through the housing of the corded telephone base 30 as explained earlier.

As with the other embodiments of the invention described herein, the configuration of substitute cradle 160 represented in FIG. 3 can be adapted so that a single configuration of cordless handset 114C can be used with a wide variety of corded telephone bases.

Figure 4:
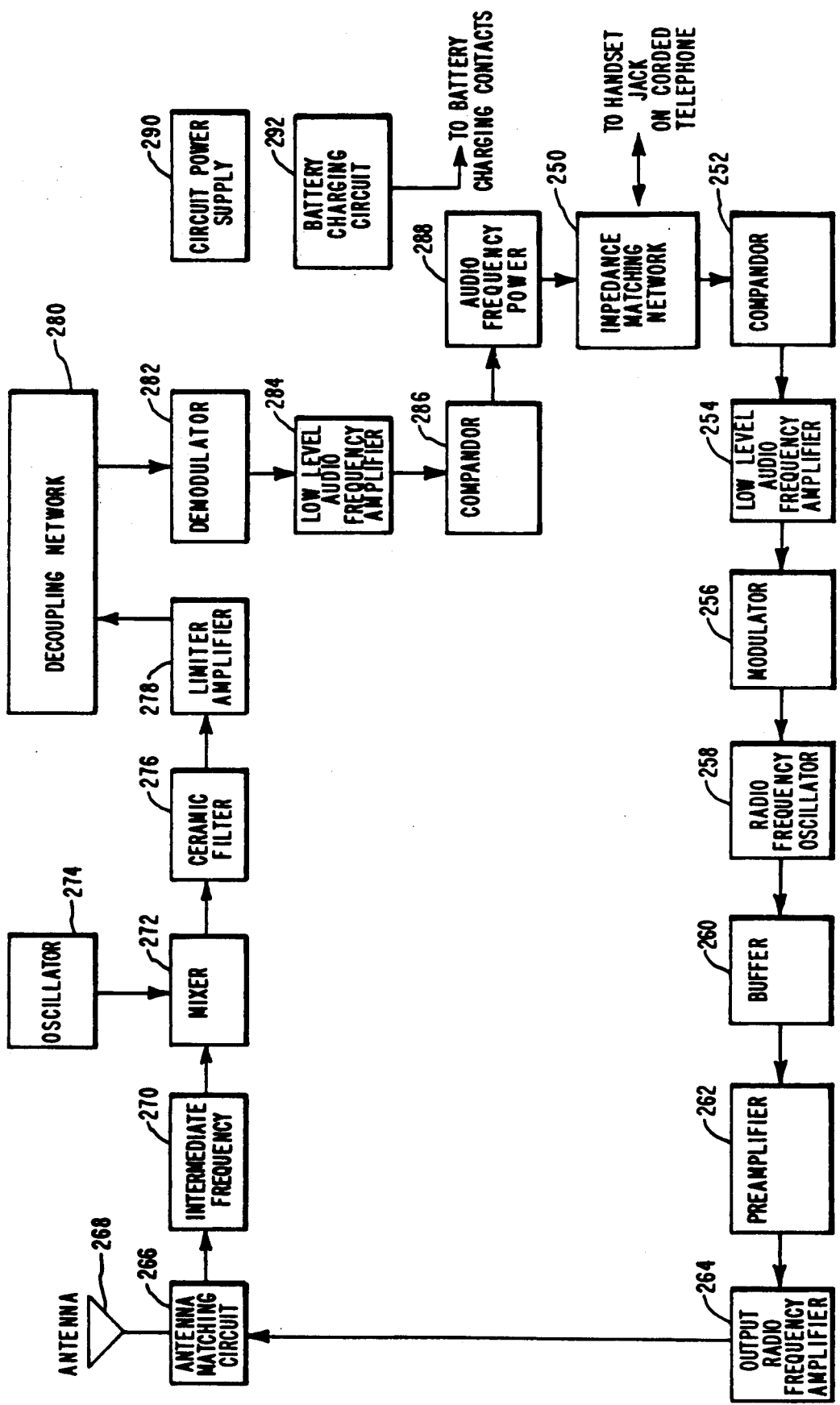
FIG. 4 is a block diagram of the cordless base included in the described embodiments of the present invention.
Figure 5:
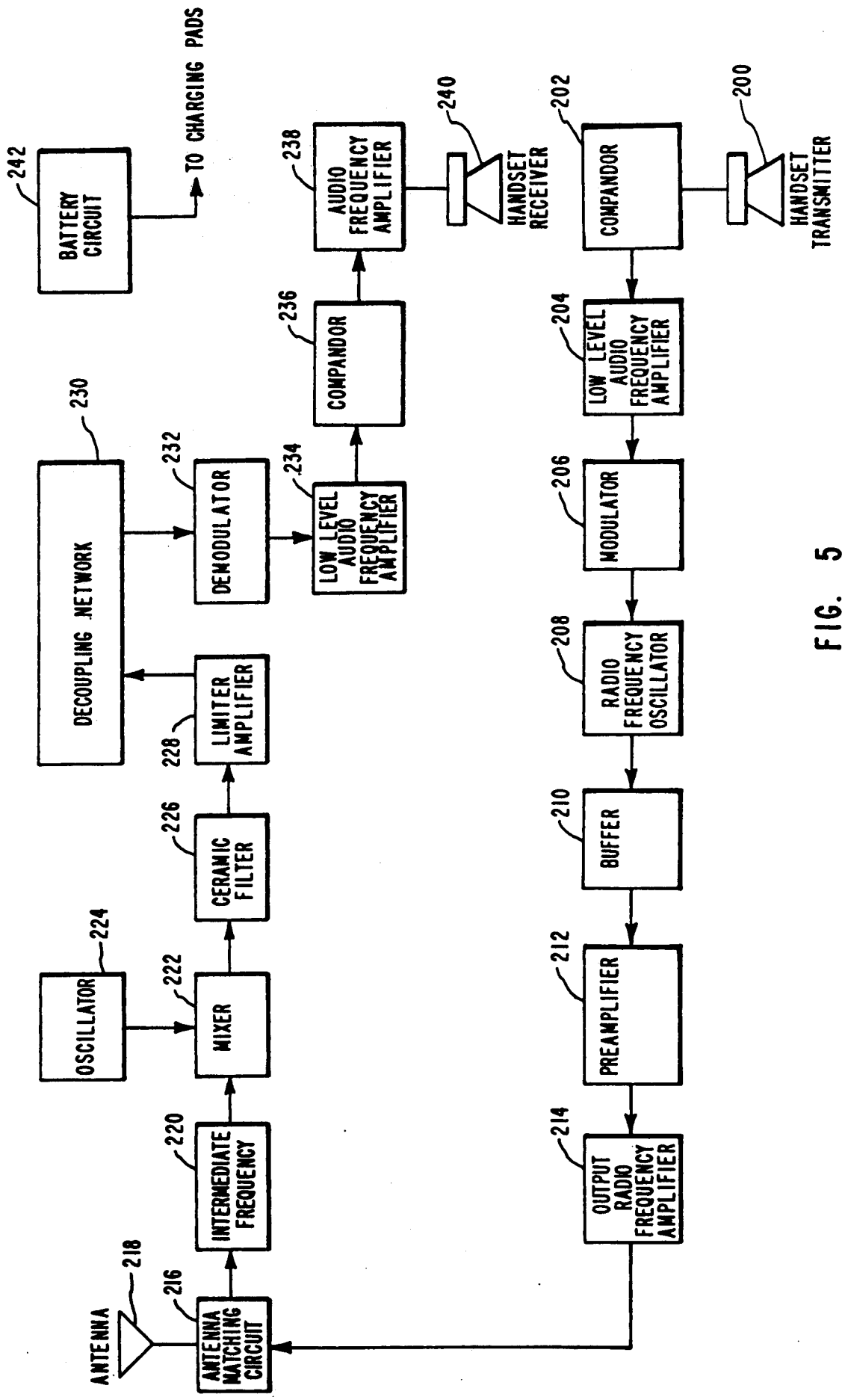
FIG. 5 is a block diagram of the cordless handset illustrated in some of the figures.

FIGS. 4 and 5 provide block diagrams of some of the principal audio and radio frequency circuits incorporated into the cordless base and cordless handset, respectively, of the described embodiments. Those skilled in the art will be able to fabricate a cordless base and a cordless handset for use with the embodiments of the present invention in accordance with the information provided in FIGS. 4 and 5.

Represented in FIG. 4 is a circuit power supply 290 and a battery charging circuit 292. The circuit power supply 290 provides electrical power for the components contained in the cordless base from the AC power received by way of a cord (138 FIGS. 1-3). The battery charging circuit 292 provides a charging current for the batteries contained in the cordless handset when the cordless handset is placed into the substitute cradle (FIGS. 1-3). The battery charging circuit 292 is the presently preferred example of the charging circuit means of the present invention.

The functional blocks of the cordless base represented in FIG. 4 generally function as either a wireless transmitter or a wireless receiver. While in the described embodiment radio frequency transmitters and receivers are used, other types of transmitters and receivers, e.g., optical or inductive, can also be used within the scope of the present invention.

Provided below in Table A is a list of those blocks which function primarily as a receiver. Provided below in Table B is a list of those blocks which function primarily as a transmitter. Those blocks listed in both Table A and Table B are involved in both functions.

TABLE A

| Reference No. | Block Name |
| --- | --- |
| 268 | Antenna |
| 266 | Antenna Matching Circuit |
| 270 | Intermediate Frequency |
| 272 | Mixer |
| 274 | Oscillator |
| 276 | Ceramic Filter |
| 278 | Limiter Amplifier |
| 280 | Decoupling Network |
| 282 | Demodulator |
| 284 | Low Level Audio Frequency Amplifier |
| 286 | Compandor |
| 288 | Audio Frequency Power Amplifier |
| 250 | Impedance Matching Network (Transducer Interface) |

TABLE B

| Reference No. | Block Name |
| --- | --- |
| 250 | Impedance Matching Network (Transducer Interface) |
| 252 | Compandor |
| 254 | Low Level Audio Frequency Amplifier |
| 256 | Modulator |
| 258 | Radio Frequency Oscillator |
| 260 | Buffer |
| 262 | Preamplifier |
| 264 | Output Radio Frequency Amplifier |
| 266 | Antenna Matching Circuit |
| 268 | Antenna |

Represented in FIG. 5 is a battery circuit 242 which functions to control the charge current directed to the battery of the cordless handset. The battery circuit 242 receives a charging current from the charging contacts on the cordless handset when placed in the substitute cradle. The functional blocks of the cordless handset represented in FIG. 5 generally function as either a battery operated cordless transmitter or a battery operated cordless receiver. Provided below in Table C is a list of those blocks which function primarily as a receiver. Provided below in Table D is a list of those blocks which function primarily as a transmitter. Those blocks listed in both Table C and Table D are involved in both functions.

TABLE C

| Reference No. | Block Name |
|---|---|
| 218 | Antenna |
| 220 | Intermediate Frequency |
| 222 | Mixer |
| 224 | Oscillator |
| 226 | Ceramic Filter |
| 228 | Limiter Amplifier |
| 230 | Decoupling Network |
| 232 | Demodulator |
| 234 | Low Level Audio Frequency Amplifier |
| 236 | Compandor |
| 238 | Audio Frequency Amplifier |
| 240 | Handset Receiver |

TABLE D

| Reference No. | Block Name |
|---|---|
| 200 | Handset Transmitter |
| 202 | Compandor |
| 204 | Low Level Audio Frequency Amplifier |
| 206 | Modulator |
| 208 | Radio Frequency Oscillator |
| 210 | Buffer |
| 212 | Preamplifier |
| 214 | Output Radio Frequency Amplifier |
| 216 | Antenna Matching Circuit |
| 218 | Antenna |

Functional blocks 286, 252, 236, and 202 (compandors represented in FIGS. 4 and 5) perform a desirable noise reduction function as is known in the art. Impedance matching network 250 (FIG. 4) is necessary for optimum performance of the system.

Figure 6:
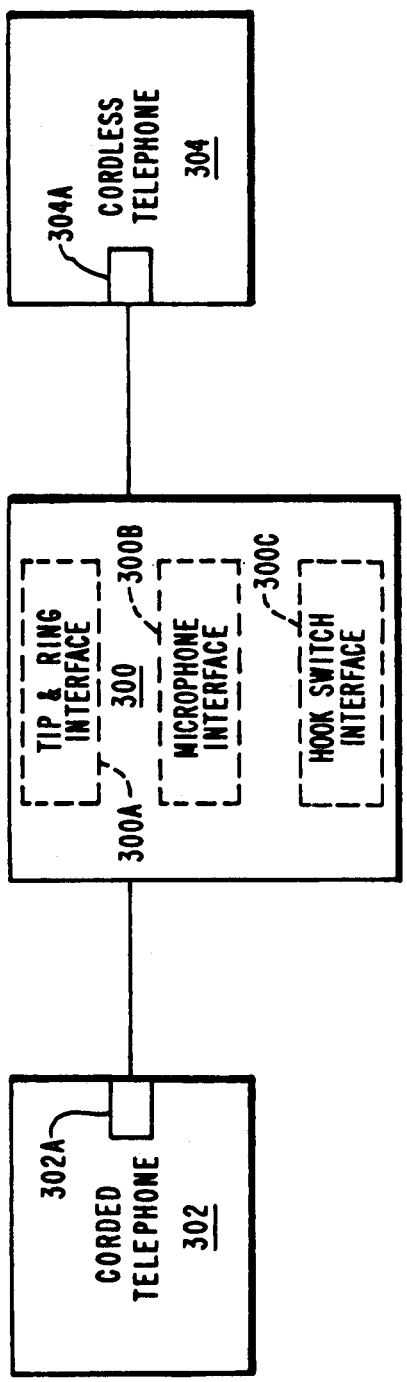
FIG. 6 is a block diagram of the another embodiment in accordance with the present invention.

Represented in FIG. 6 is another embodiment of the present invention for adding cordless handset capability to an existing corded telephone. The embodiment represented in FIG. 6 allows an unmodified cordless telephone 304 to be connected to an existing corded telephone 302 thereby adding cordless handset capability to the existing corded telephone 302. The cordless base and the cordless handset (not represented in FIG. 6) which are normally supplied with the cordless telephone are utilized in their entirety with the embodiment represented in FIG. 6.

The embodiment of the present invention represented in FIG. 6 comprises a tip and ring interface 300A, a microphone interface 300B, and a hook switch interface 300C. The tip and ring interface 300A, a microphone interface 300B, and a hook switch interface 300C can desirably all be contained as a single unit represented by the box 300. The embodiment 300 is principally connected between the handset jack 302A provided on the corded telephone 302 and the line jack 304A provided on the cordless telephone. Generally, depending upon the particular application of the invention, providing hook switch control may require an independent interconnection (not represented) to the corded telephone as will be appreciated after an understanding of teachings contained herein.

With the embodiment of the present invention represented in FIG. 6 connected as shown in that figure, the embodiment 300 appears as a handset to the corded telephone and as a telephone line to the cordless telephone 304. Thus, each telephone 302 and 304 "sees" a device which was intended to be connected to their respective jacks.

The tip and ring interface 300A provides an impedance matching function, and other necessary functions, in order to interface the two wire line jack (comprising a tip conductor and a ring conductor) found on the cordless telephone 304 to the four wire jack (comprising a pair of audio conductors) found on the corded telephone 302. Structures which perform similar or equivalent functions to the tip and ring interface described herein are intended to fall within the scope of the present invention.

The microphone interface represented in FIG. 6 selectively interfaces with one of three different microphones which are commonly used in corded telephones: carbon microphones, dynamic microphones, and electret microphones. Each of the microphones which are commonly included in corded telephones have differences in output levels and other parameters. Thus, for optimum performance, the embodiment of the present invention must be adapted to each type of microphone encountered. The illustrated embodiment allows one of the three types to be selected when the embodiment is installed.

The hook switch interface functions so that when the cordless telephone 304 is activated or taken off hook the corded telephone is also taken off hook. Thus, when the cordless handset of the cordless telephone is activated, it is connected to the telephone line via the corded telephone 302. It will be appreciated that installation of the illustrated embodiment requires connection to the internal hook switch circuitry of the corded telephone, and in some cases modification thereof, all of which is within the skill of one experienced in the art using the disclosure provided herein.

It will further be appreciated that it may be desirable to include just the tip and ring interface 300A alone, or the tip and ring interface 300A with the microphone interface 300B and/or the hook switch interface 300C within the embodiment of the present invention. The tip and ring interface 300A, the microphone interface 300B, and/or the hook switch interface 300C may also be included in the cordless base 126A–C represented in the previous figures. The hook switch interface 300C is another presently preferred example of a hook switch means within the scope of the present invention.

Figures 1, 7:
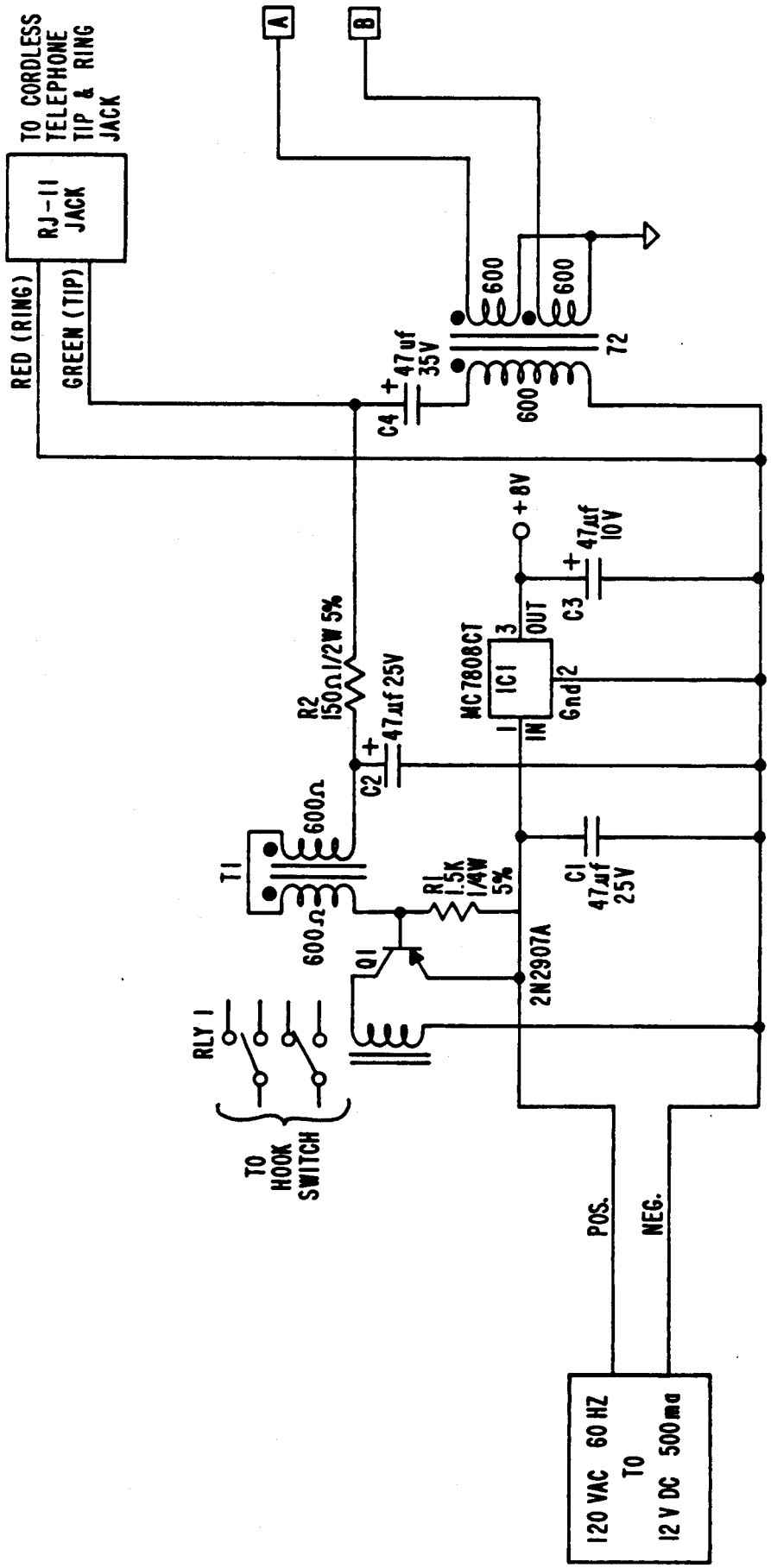
Figures 2, 7:
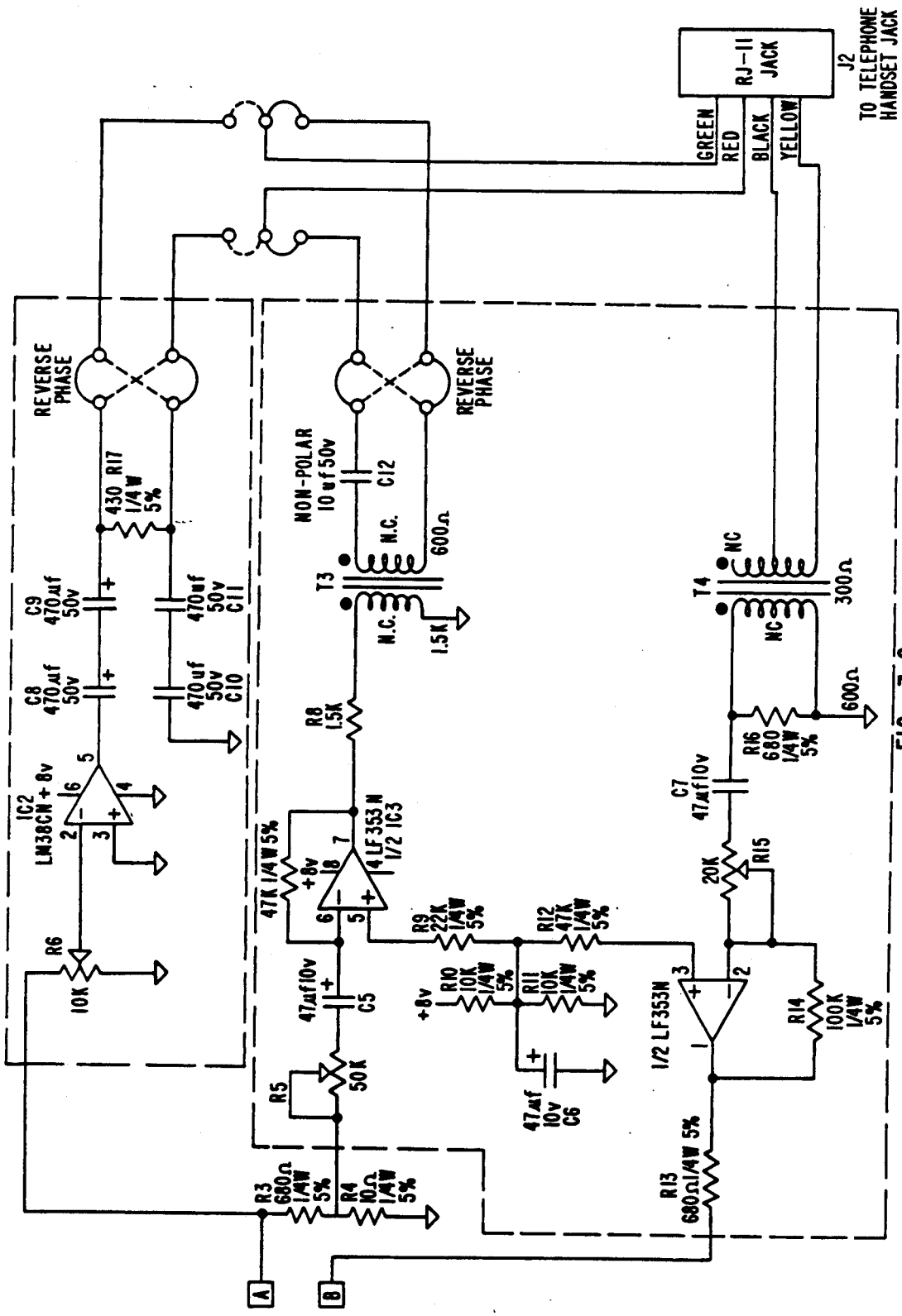

FIGS. 7-1 and 7-2 are a schematic diagram showing the presently preferred circuit implementation of the a tip and ring interface 300A, a microphone interface 300B, and a hook switch interface 300C represented in FIG. 6. The boxed letter designations in the figures indicate the circuit interconnections between the two figures.

The schematic diagram shown in FIGS. 7-1 and 7-2 are provided with the reference designations and component values which are customarily included in schematic diagrams. With the schematic diagrams included in FIGS. 7-1 and 7-2, the tip and ring interface 300A, the microphone interface 300B, and the hook switch interface 300C may be readily constructed and installed in a large number of applications.

Provided below in Table E is a list of the components, and their corresponding values, which are included in FIGS. 7-1 and 7-2.

TABLE E

| Qty. | Description | Reference Designation |
|---|---|---|
| 1 | 120 V.AC.60 CYCLE TO 120VDC 500 MA AC ADAPTER | |
| 1 | DPDT 12V RELAY, COIL RES.200-500 OHMS | RLY-1 |
| 1 | TRANSISTOR 2N2907A | Q1 |

TABLE E-continued

| Qty. | Description | Reference Designation |
|---|---|---|
| 1 | 1.5K ¼ WATT 5% RESISTOR | R1 |
| 1 | MC 7808CT T0220 5% 8 VOLT REGULATOR | IC1 |
| 2 | 47 UF AT 25 VOLT RADIAL LEAD ALUM. ELECT CAP | C2,C1 |
| 4 | 47 UF AT 10 VOLT RADIAL LEAD ALUM. ELECT CAP | C3,C5,C6 |
| 1 | 470 UF AT 35 VOLT RADIAL LEAD ALUM ELECT CAP | C4 |
| 1 | 470 UF AT 50 VOLT RADIAL LEAD ALUM. ELECT CAP | C8,C9,C10, C11 |
| 1 | 150 OHM ¼ WATT 5% RESISTOR | R2 |
| 1 | 600 TO 600 OHM CENTER TAP TRANSFORMER AT 1 KHZ PRIMARY DC RESISTANCE 65 OHM SECONDARY DC RESISTANCE 65 OHM | T1 |
| 1 | 600 TO DUAL SECONDARY 600 OHM TRANSFORMER PRIMARY DC RESISTANCE 78 OHM. APPROX FIRST SECONDARY DC RESISTANCE 65 OHMS, SECOND SECONDARY DC RESISTANCE 60 OHMS AT 1 KHZ | T2 |
| 1 | 300 TO 600 OHM TRANSFORMER AT 1 KHZ PRIMARY DC RESISTANCE OF 30 OHMS SECONDARY DC RESISTANCE OF 35 OHMS | T4 |
| 1 | 1.5K TO 300 OHM TRANSFORMER AT 1 KHZ PRIMARY DC RESISTANCE OF 30 OHMS SECONDARY DC RESISTANCE OF 35 OHMS | T3 |
| 1 | ONE TURN 50K POTENTIOMETER .3–.5 WATTS | R5 |
| 1 | ONE TURN 20K POTENTIOMETER .3–.5 WATTS | R15 |
| 1 | ONE TURN 10K POTENTIOMETER .3–.5 WATTS | R6 |
| 1 | LM 386N 400 mW AUDIO AMPLIFIER | IC2 |
| 1 | 10 uf 50 VOLT NON-POLAR ALUM. ELECT. CAP | C12 |
| 1 | LF 353N DUAL BIFET OP-AMP | IC3 |
| 1 | 430 OHM ¼ WATT 5% RESISTOR | R17 |
| 2 | 680 OHM ¼ WATT 5% RESISTOR | R3,R16 |
| 1 | 1.5 k OHM ¼ WATT 5% RESISTOR | R8 |
| 1 | 10 OHM ¼ WATT 5% RESISTOR | R4 |
| 2 | 47 OHM ¼ WATT 5% RESISTOR | R7,R12 |
| 1 | 22K OHM ¼ WATT 5% RESISTOR | R9 |
| 2 | 10K OHM ¼ WATT 5% RESISTOR | R10,R11 |
| 2 | RJ11 TELEPHONE JACKS | J1,J2 |

After consideration of the foregoing, it will be appreciated that the present invention provides a method and apparatus to add cordless handset capability to an existing corded telephone in an economical manner which has been previously unknown in the art. Also, the present invention allows cordless handset capability to be added to an existing corded telephone without making any permanent modifications to the existing corded telephone. Still further, the present invention allows cordless handset capability to be added to an existing corded telephone in a minimum of time and without requiring any modifications internally to the corded telephone or to the telephone network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for adding cordless handset capability to an existing corded telephone, the existing corded telephone having an original handset cradle, the apparatus comprising:
    cradle insert means for forming a substitute handset cradle on the original handset cradle, the substitute handset cradle fitting into the original handset cradle and receiving a cordless handset having at least one battery charging connection; and
    charging contact means, positioned on the cradle insert means, for providing a charging current to the battery charging connection on the cordless handset when the cordless handset is placed on the substitute cradle.

2. An apparatus for adding cordless handset capability to an existing corded telephone as defined in claim 1 further comprising charging circuit means for supplying a charging current to the charging contact means.

3. An apparatus for adding cordless handset capability to an existing corded telephone as defined in claim 2 wherein the charging circuit means is located externally to the existing corded telephone and wherein the apparatus further comprises interconnection means for connecting the charging circuit means to the charging contact means, the interconnection means routed externally to the existing corded telephone.

4. An apparatus for adding cordless handset capability to an existing corded telephone as defined in claim 2 wherein the charging circuit means is located externally to the existing corded telephone and wherein the apparatus further comprises interconnection means for connecting the charging circuit means to the charging contact means, the interconnection means routed at least partially within the existing corded telephone.

5. An apparatus for adding cordless handset capability to an existing corded telephone as defined in claim 1 wherein the existing telephone set includes a hook switch and wherein the apparatus further comprises hook switch means for actuating the hook switch on the existing telephone as the handset is raised and lowered.

6. An apparatus for adding cordless handset capability to an existing corded telephone as defined in claim 1 wherein the existing telephone set includes a hook switch and wherein the apparatus further comprises a cordless handset, the cordless handset having a switch, the switch being adapted to perform a hook switch function.

7. An apparatus for adding cordless handset capability to an existing corded telephone as defined in claim 1 wherein the cradle insert means comprises:
    a first receptacle;
    a second receptacle; and
    wherein the charging contact means comprises a pair of charging contacts positioned in the second receptacle.

8. An apparatus for adding cordless handset capability to an existing corded telephone as defined in claim 7 wherein the first receptacle and the second receptacle are formed as a unitary structure.

9. An apparatus for adding cordless handset capability to an existing corded telephone as defined in claim 7 wherein the first receptacle and the second receptacle are separate.

10. An apparatus for adding cordless handset capability to an existing corded telephone as defined in claim 7 further comprising securing means for securing the cradle insert means over the original handset cradle.

11. An apparatus for adding cordless handset capability to an existing corded telephone as defined in claim 1 further comprising:
   a cordless handset comprising a wireless transmitter and a wireless receiver; and
   a cordless base comprising a wireless transmitter and a wireless receiver.

12. An apparatus for adding cordless handset capability to an existing corded telephone as defined in claim 11 wherein the existing telephone comprises a four conductor handset jack and a line jack and wherein the cordless base comprises connection means for connecting the base unit to the handset jack on the existing telephone.

13. An apparatus for adding cordless handset capability to an existing corded telephone as defined in claim 11 further wherein the wireless transmitters comprise radio frequency transmitters and the wireless receivers comprise radio frequency receivers.

14. An apparatus for adding cordless handset capability to an existing corded telephone as defined in claim 1 wherein the existing telephone comprises a multi-line telephone.

15. An apparatus for converting an existing corded telephone, the existing corded telephone having an original handset cradle and a four wire handset jack, into a telephone having cordless handset capability, the apparatus comprising:
   a cordless handset comprising a wireless transmitter, a wireless receiver, and a battery charging connector;
   cradle insert means for forming a substitute handset cradle on the original handset cradle, the substitute cradle receiving the cordless handset;
   charging contact means for providing a charging current to the battery charging connector on the cordless handset when the cordless handset is resting in the substitute cradle;
   a cordless base comprising a wireless transmitter and a wireless receiver;
   charging circuit means for providing a charging current to the charging contact means; and
   interconnection means for electrically connecting the handset jack to the cordless base so that information can be conveyed therebetween and for electrically connecting the charging contact means to the charging circuit means such that the batteries in the cordless handset are charged when the handset is resting in the substitute cradle and such that duplex communications can be established between the cordless base and the cordless handset when the cordless handset is removed from the substitute cradle.

16. An apparatus for converting an existing corded telephone into a telephone having cordless handset capability as defined in claim 15 wherein the charging circuit means is located externally to the existing corded telephone and wherein the interconnection means is routed externally to the existing corded telephone.

17. An apparatus for converting an existing corded telephone into a telephone having cordless handset capability as defined in claim 15 wherein the charging circuit means is located externally to the existing corded telephone and wherein the interconnection means is routed at least partially within the existing corded telephone.

18. An apparatus for converting an existing corded telephone into a telephone having cordless handset capability as defined in claim 15 wherein the existing telephone set includes a hook switch and wherein the apparatus further comprises hook switch means for actuating the hook switch on the existing telephone as the handset is raised and lowered.

19. An apparatus for converting an existing corded telephone into a telephone having cordless handset capability as defined in claim 18 wherein the hook switch means comprises an aperture located in the cradle insert means.

20. An apparatus for converting an existing corded telephone into a telephone having cordless handset capability as defined in claim 15 wherein the existing telephone set includes a hook switch and wherein cordless handset further comprises a switch, the switch being adapted to perform a hook switch function.

21. An apparatus for converting an existing corded telephone into a telephone having cordless handset capability as defined in claim 15 wherein the cradle insert means comprises:
   a first receptacle;
   a second receptacle; and
   wherein the charging contact means comprises a pair of charging contacts positioned in the second receptacle.

22. An apparatus for converting an existing corded telephone into a telephone having cordless handset capability as defined in claim 21 wherein the first receptacle and the second receptacle are formed as a unitary structure.

23. An apparatus for converting an existing corded telephone into a telephone having cordless handset capability as defined in claim 21 wherein the first receptacle and the second receptacle are separate.

24. An apparatus for converting an existing corded telephone into a telephone having cordless handset capability as defined in claim 21 further comprising securing means for removably securing the cradle insert means over the original handset cradle.

25. An apparatus for converting an existing corded telephone into a telephone having cordless handset capability as defined in claim 15 wherein the existing telephone comprises an RJ modular handset jack with four audio conductors and an RJ modular line jack with two line conductors and wherein the cordless base comprises a microphone interface.

26. An apparatus for converting an existing corded telephone into a telephone having cordless handset capability as defined in claim 15 wherein the cordless base further comprises a hook switch interface.

27. An apparatus for converting an existing corded telephone into a telephone having cordless handset capability as defined in claim 26 further wherein the wireless transmitters comprise radio frequency transmitters and the wireless receivers comprise radio frequency receivers.

28. A system for replacing a corded handset provided on an existing corded telephone with a cordless handset capable of duplex communication, the existing corded telephone having an original handset cradle and a four wire handset jack, the system comprising:
   a cordless handset comprising a radio frequency transmitter, a radio frequency receiver, and at least one battery charging connector;
   a substitute handset cradle having a first and a second receptacle, each receptacle receiving a portion of the cordless handset, the substitute handset cradle fitting onto the original handset cradle;

means for securing the substitute handset cradle into position on the original handset cradle;

charging contacts positioned in the substitute handset cradle adapted for conveying a charging current to the battery charging connector on the cordless handset when the cordless handset is resting in the substitute cradle;

a cordless base;

a radio frequency transmitter located in the cordless base;

a radio frequency receiver located in the cordless base;

a charging circuit located in the cordless base;

first interconnection means for electrically connecting the handset jack to the cordless base so that information can be conveyed therebetween such that duplex communications can be established between the cordless base and the cordless handset when the cordless handset is removed from the substitute cradle; and second interconnection means for electrically connecting the charging contacts to the charging circuit such that the batteries in the cordless handset are charged when the handset is resting in the substitute cradle.

29. A system for replacing a corded handset provided on an existing corded telephone with a cordless handset capable of duplex communication as defined in claim 28 wherein the second interconnection means is routed externally to the existing corded telephone.

30. A system for replacing a corded handset provided on an existing corded telephone with a cordless handset capable of duplex communication as defined in claim 28 wherein the second interconnection means is routed at least partially within the existing corded telephone.

31. A system for replacing a corded handset provided on an existing corded telephone with a cordless handset capable of duplex communication as defined in claim 28 further comprises hook switch means for actuating the hook switch on the existing telephone as the handset is raised and lowered.

32. A system for replacing a corded handset provided on an existing corded telephone with a cordless handset capable of duplex communication as defined in claim 31 wherein the hook switch means comprises an aperture provided in the substitute handset cradle through which a hook switch can extend when the substitute handset cradle is secured on the original handset cradle.

33. A system for replacing a corded handset provided on an existing corded telephone with a cordless handset capable of duplex communication as defined in claim 28 wherein the charging contacts comprise a pair of charging contacts positioned in the second receptacle.

34. A system for replacing a corded handset provided on an existing corded telephone with a cordless handset capable of duplex communication as defined in claim 28 wherein the first receptacle and the second receptacle are formed together as a unitary structure.

35. A system for replacing a corded handset provided on an existing corded telephone with a cordless handset capable of duplex communication as defined in claim 28 wherein the first receptacle and the second receptacle are formed as separate structures.

36. A system for replacing a corded handset provided on an existing corded telephone with a cordless handset capable of duplex communication as defined in claim 28 wherein the cordless base further comprises a hook switch interface.

37. A system for adding cordless capability to an existing corded telephone, the existing corded telephone having an original corded base with a handset cradle, a handset jack, and a corded handset with a cord, the system comprising:

a cordless handset comprising a wireless transmitter and a wireless receiver;

at least one battery charging connector located on the cordless handset;

first charging cradle means fitting onto said original handset cradle for receiving a telephone handset, the charging cradle means being free standing from the existing corded telephone;

first charging contact means, positioned in the first charging cradle means, for conveying a charging current to the battery charging connector on the cordless handset when the cordless handset is resting in the first charging cradle means;

first hook switch means at said corded base for actuating said corded telephone when said corded handset is carried by said first charging cradle means;

a cordless base;

a wireless transmitter located in the cordless base;

a wireless receiver located in the cordless base;

a charging circuit means located in the cordless base;

first interconnection means for electrically connecting the handset jack of the corded base to the cordless base so that information can be conveyed therebetween such that duplex communications can be established between the existing corded telephone and the cordless handset;

second charging cradle means formed at said cordless base for receiving a handset;

second charging contact means positioned in said second charging cradle means for conveying a charging current to the battery charging connector on the cordless handset when the cordless handset is resting in the second charging cradle means; and second hook switch means at said cordless base for actuating said corded telephone when said corded handset is carried by said second charging cradle means.

38. A system for adding cordless handset capability to an existing corded telephone, the existing corded telephone having an original handset cradle, a handset jack, and a corded handset with a cord, as defined in claim 37 wherein the second charging cradle means is formed integrally with the cordless base.

39. A system for adding cordless handset capability to an existing corded telephone, the existing corded telephone having an original handset cradle, a handset jack, and a corded handset with a cord, as defined in claim 37 wherein said first charging cradle means comprises a substitute handset cradle having a first and a second receptacle, the substitute handset cradle fitting onto the original handset cradle.

40. A system for adding cordless handset capability to an existing corded telephone, the existing corded telephone having an original handset cradle, a handset jack, and a corded handset with a cord, as defined in claim 39 further comprising:

charging circuit means for supplying a charging current to each charging contact means; and second interconnection means for connecting the charging circuit means to each charging contact means, the interconnection means being routed at least partially externally to the existing corded telephone.

41. A method of converting an existing corded telephone to a cordless telephone comprising the steps of:
   detaching the existing corded handset from the corded telephone;
   attaching a substitute cradle to the original cradle, the substitute cradle having at least a pair of charging contacts;
   connecting a charging circuit to the pair of charging contacts;
   placing a cordless handset in the substitute cradle, the cordless handset including both a wireless transmitter and a wireless receiver and a battery charging connection; and
   connecting a cordless base to the existing telephone, the cordless base including both a wireless transmitter and a wireless receiver, such that a communication link may be established between the cordless handset and the existing telephone when the cordless handset is removed from the substitute cradle.

42. A method of converting an existing corded telephone to a cordless telephone as defined in claim 41 wherein the step of attaching a substitute cradle to the original cradle comprises the step of securing a substitute cradle having a first receptacle and a second receptacle joined together on the original cradle.

43. A method of converting an existing corded telephone to a cordless telephone as defined in claim 41 wherein the step of attaching a substitute cradle to the original cradle comprises the step of securing a substitute cradle having a first receptacle and a second receptacle, the first and the second receptacles being formed from separate structures, on the original cradle.

44. A method of converting an existing corded telephone to a cordless telephone as defined in claim 41 wherein the step of connecting a charging circuit to the pair of charging contacts comprises the step of routing an interconnecting cable externally of the existing corded telephone from the charging circuit to the pair of charging contacts.

45. A method of converting an existing corded telephone to a cordless telephone as defined in claim 41 wherein the step of connecting a charging circuit to the pair of charging contacts comprises the step of routing an interconnecting cable at least partially internally to the existing corded telephone from the charging circuit to the pair of charging contacts.

46. A method of converting an existing corded telephone to a cordless telephone as defined in claim 41 wherein the step of placing a cordless handset in the substitute cradle comprises the steps of:
   making electrical contact between the pair of charging contacts and the battery charging connection; and
   depressing a hook switch.

47. A method of converting an existing corded telephone to a cordless telephone as defined in claim 41 further comprising the step of transmitting a radio frequency signal from the cordless handset to the cordless base.

48. A method of converting an existing corded telephone to a cordless telephone as defined in claim 41 wherein the step of connecting a cordless base further comprises the step of connecting the cordless base to an AC power source.

* * * * *

UNITED STATES PATENT AND TRADEMARK OFFICE
CERTIFICATE OF CORRECTION

PATENT NO. : 5,010,565
DATED : April 23, 1991
INVENTOR(S) : BRYAN NASH et al.

It is certified that error appears in the above-identified patent and that said Letters Patent is hereby corrected as shown below:

```
Column 1, line 15, "communications" should be --communication--
Column 3, line 67, delete "the"
Column 7, line 67, "at" should be --as--
Column 8, line 68, "an" should be --a---
Column 12, line 44, delete "a"
Column 16, line 53, delete "further"
```

Signed and Sealed this

Ninth Day of March, 1993

*Attest:*

STEPHEN G. KUNIN

*Attesting Officer*  Acting Commissioner of Patents and Trademarks